June 7, 1932.   C. C. FUERST   1,861,850

CAMERA CONSTRUCTION AND METHOD OF ASSEMBLING SAME

Filed April 14, 1930

Inventor
Carl C. Fuerst,

Attorneys

Patented June 7, 1932

1,861,850

UNITED STATES PATENT OFFICE

CARL C. FUERST, OF ROCHESTER, NEW YORK, ASSIGNOR TO EASTMAN KODAK COMPANY, OF ROCHESTER, NEW YORK, A CORPORATION OF NEW YORK

CAMERA CONSTRUCTION AND METHOD OF ASSEMBLING SAME

Application filed April 14, 1930. Serial No. 443,965.

This invention relates to photography, and more particularly to the joining of two camera parts. The two parts used to illustrate the invention in this instance are embodied in a roll holder for a box camera.

It is an object of this invention to provide a method of joining and a joint for two camera parts which is simple, efficient, and may be made at a lower cost than the methods heretofore used.

Another object of this invention is to provide a method of joining two camera parts, which is particularly adapted to securing the film spool holders to the body of a box camera.

Other objects will appear in the following specification wherein reference is made to the accompanying drawing. The same reference characters indicate the same parts throughout.

Figure 1:
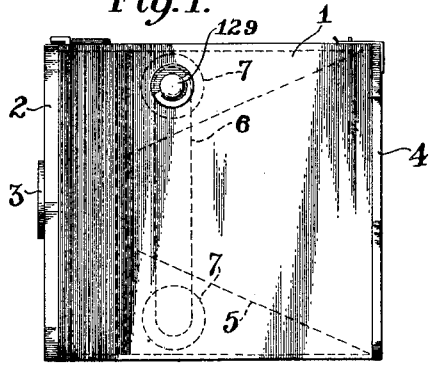
Figure 1 is a side elevation of a box camera.
Figure 2:
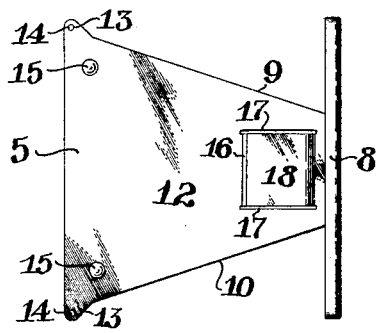
Figure 2 is a side elevation of the body of a box camera.

This invention, as illustrated, is embodied in a box camera comprising a casing 1, front plate 2, lens mount 3, door 4 and a roll holding device comprising a body 5 and spring supports 6 holding the spools 7 in position as shown in Figure 1. Though applying to the joining of any two camera parts, I am using the body 5 and spring support 6 as a specific illustration of my invention.

Figure 7:
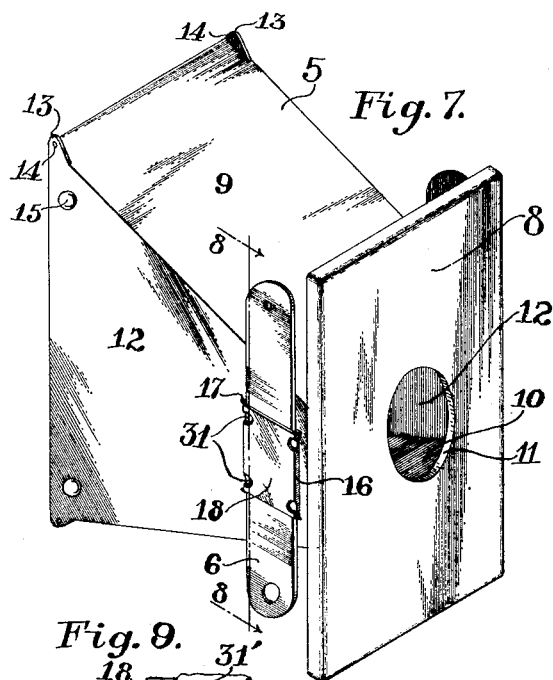
Figure 7 is a perspective of a roll holder for a box camera embodying my invention.

The body 5 comprises a front plate 8, top and bottom walls 9 and 10 sloping to the light aperture 11 (Figure 7) in the front plate 8. Side walls 12 connect the sloping walls 9 and 10. The side walls 12 are provided with lugs 13 at their rear corners having small apertures 14 which support guide rollers for the film to travel over. There are protuberances 15 to engage the inner surface of the camera casing 1 to properly locate the roll holder therein. A seat 16 is provided on each side of the body 5 for the spring supports 6. This seat 16 is formed by cutting two parallel slots 17 slightly longer than the width of a spring support 6 and forming up the portion 18 between said slots so that the spring support may fit between the formed up portion 18 and the wall 12.

Figure 3:
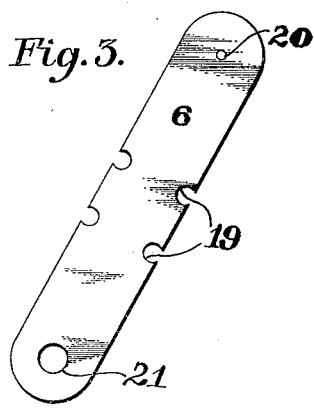
Figure 3 is a side elevation of one of the spring supports attached to a camera part and constructed in accordance with a preferred embodiment of my invention.
Figure 4:
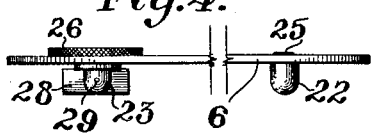
Figure 4 is a fragmentary elevation of the spring support equipped with centering pins for the film spools.
Figure 6:
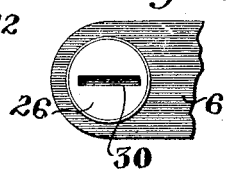
Figure 6 is a fragmentary plan of the winding element on the spring support.
Figure 5:
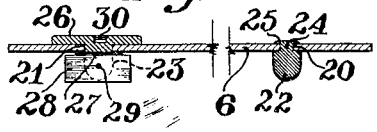
Figure 5 is a longitudinal section through the film spool support shown in Figure 4.

The supports 6 are made of spring sheet metal, and as shown in Figure 3, are provided with four notches 19, two on each side positioned so that they will be covered by the wall 18 of the seat 16. The springs also have small apertures 20 and 21 at each end. These notches 19 may be of any desired shape, number, or in any position with respect to the support as shown, for instance, in Figure 9 where two apertures 19' formed in the middle of the spring support 6 are used. The small apertures 20 and 21 are provided to receive the spool centering pins 22 and 23 as shown in Figures 4 and 5. The centering pin 22 is provided with an end 24 fitting into the aperture 20, and permitting the end of the centering pin to be headed over forming a rivet 25. The centering pin 23, however, is also adapted to transmit power to a film spool and is provided with a web 28 for engaging the usual slot in a film spool. A knurled head 26 is provided to facilitate threading and there is a slot 27 to receive a web 28 which is supported by pin 29.

The head 26 has a slot 30 which comes into registration with a web on the winding key 129 supported by the casing 1 when the camera body is slid into the camera case 1. There are two of the supports 6, one on each side of the body 5, one as described above and the other having two of the smaller apertures 20 in which spool centering pins 22 are riveted.

In the operation of assembling the above-mentioned parts and forming a joint, a body 5 is formed as described above whereupon the spring supports 6 are placed flush with the side walls 12 and pushed under the formed up wall portions 18 and out on the exterior of the wall 12 on the opposite side of the seat 16, locating the support 6 in position so that the notches 19 are covered by the wall portion 18. The assembly is placed in a press which deforms the wall portion 18, forming the depressions 31 in Figure 7 and 31' in Figure 9, by pressing portions of the metal into the notches 19 thereby forming a firm joint between the body 5 and the spring supports 6. After the above operations are completed, the centering pins 22 and 23 are located in their respective positions.

Figures 8, 9:
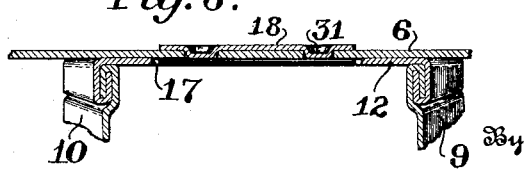
Figure 8 is a section on line 8—8 of Figure 7.
Figure 9 is a fragmentary perspective of a modified form of my invention.

In the present embodiment the body 5 is formed by overlapping the edges of the metal walls 9, 10 and 12 forming a light tight seam as shown in Figure 8.

The word "notches" in the claims is defined to mean notches, apertures or openings of any convenient size, shape or in any position with respect to the parts.

Having thus described my invention what I claim and wish to secure by Letters Patent is:

1. A method of attaching a support to a photographic roll holder which comprises slotting the side plate of said roll holder, forming up a portion between said slots, inserting the support provided with notches beneath the formed up portion, and then depressing areas of the formed up portion into the notches in the support.

2. A method of attaching a flat support to a photographic roll holder which comprises slotting the side plate of said roll holder, forming up a portion between said slots, inserting the flat support provided with notches beneath the formed up portion and in surface contact with the side plate of said roll holder, and then depressing areas of the formed up portion into the notches in the support.

3. A method of attaching a flat support to a photographic roll holder which comprises cutting slots in the side plate of said roll holder substantially as long as the width of the support, forming up a portion between said slots, inserting the flat support provided with notches beneath the formed up portion and abutting the side plate of said roll holder, and then depressing areas of the formed up portion into the notches in the support.

4. A method of attaching a flat support to a photographic roll holder which comprises slotting the side plate of said roll holder, forming up a portion between said slots an extent equal to the thickness of the support, inserting the flat support provided with notches beneath the formed up portion and in abutment with the side plate of said roll holder, and then deforming areas of the formed up portion into the notches in the support.

5. In a camera the combination with a roll holder having a side plate provided with slots and a seat formed up between said slots, of a support provided with notches and located in said seat and deformed areas in said seat protruding into the notches of the support.

6. In a camera the combination with a support provided with notches, of a roll holder having a side plate provided with slots substantially as long as the width of said support and a seat formed up between said slots, and means for attaching the support to the roll holder including deformed areas in said seat extending into the notches of the support.

7. In a camera the combination with a support provided with notches, of a roll holder having a side plate provided with slots substantially as long as the width of said support and a seat formed up between said slots an amount substantially equal to the thickness of said support and depressed areas in said seat extending into the notches of the support.

8. In a camera the combination with a roll holder having a side plate provided with slots and a seat formed up between said slots, of a support provided with notches and located in said seat to abut the side plate and depressed areas in the seat extending into the notches of the support.

9. In a photographic roll holder the combination with a flat film spool support centrally provided with notches, of a side plate for the roll holder provided with slots substantially as long as the width of the film spool support and having a seat formed up an extent substantially equal to the thickness of said support, and depressed areas in said seat extending into the notches in the support and holding the remainder of said support in surface abutment with the side plate of the roll holder.

Signed at Rochester, New York, this 9th day of April, 1930.

CARL C. FUERST.